SELF-LOADING REEL

Filed May 16, 1958 3 Sheets-Sheet 1

INVENTORS,
Willard J. Faulkner
Robert B. Rhoades
By Brown, Jackson, Boettcher + Dienner
Attys.

Jan. 8, 1963 W. J. FAULKNER ETAL 3,072,355

SELF-LOADING REEL

Filed May 16, 1958 3 Sheets-Sheet 2

INVENTORS.
Willard J. Faulkner
Robert B. Rhoades

By Brown, Jackson, Boettcher + Dienner Attys.

Jan. 8, 1963 W. J. FAULKNER ETAL 3,072,355

SELF-LOADING REEL

Filed May 16, 1958 3 Sheets-Sheet 3

INVENTORS.
Willard J. Faulkner
Robert B. Rhoades
By
Brown, Jackson, Boettcher + Dienner
Attys United States Patent Office
3,072,355
Patented Jan. 8, 1963

3,072,355
SELF-LOADING REEL

Willard J. Faulkner and Robert B. Rhoades, Coloma, Mich., assignors to V-M Corporation, Benton Harbor, Mich., a corporation of Michigan
Filed May 16, 1958, Ser. No. 735,778
15 Claims. (Cl. 242—74.2)

The present invention is concerned with the feeding or loading of reel or spool carried mediums, such as magnetic recording tape or wire and camera or motion picture film, onto their reels and into or through the apparatus, such as recorder-reproducers, cameras and projectors, with which the medium is intended for cooperation. More particularly, the invention relates to a self-loading reel for such mediums, and to improvements afforded as a consequence thereof in apparatus of the character described.

One of the most vexatious problems encountered in use of reel or spool carried mediums is the manual task of applying the end of the medium to the reel for commencement of winding. In tape recorders and motion picture film projectors, for example, the end of the tape must be inserted manually between the reel flanges and into a radial slot in the hub of the reel and held in that position while at least one complete winding of the tape is applied to the hub to overlie the portion thereof within the slot. As any one who has attempted this manipulation will attest, it is a substantial deterrent to more widespread acceptance of reel fed apparatus.

It is the primary object of the present invention to overcome the above-stated disadvantage by the provision of a completely automatic self-loading reel.

Another object of the invention is the provision of an improved reel adapted to load itself as a consequence simply of disposition of the medium contiguous to the reel and rotation of the reel in winding direction.

A further object of the invention is the provision of an automatic reel that is self-loading upon rotation in the winding direction and that, upon rotation in the unwinding direction, will automatically release the medium therefrom and condition itself for a subsequent automatic loading or feeding operation.

To accomplish the foregoing objects, we first provide means for guiding the medium relative to the reel hub and for locating the medium in predetermined contiguous relation to the reel. In its simplest form, such means comprises a flange concentric with the hub and disposed to one side thereof. In fact, the reel means per se may consist simply of the flange and hub. The flange is disposed to receive at a predetermined radial location on the hub side thereof the lead end portion of the particular medium, say magnetic recording tape, the tape being located for loading purposes at a point spaced outwardly from the hub in a given direction relative to a fixed reference. Movably mounted on the flange is a tape or medium securing means which is movable between the hub and a position radially outward of the location at which the medium is received on the flange, so that the medium or tape may conveniently and readily be located on the flange between the hub and said means. Mounted at or in predetermined relation to the said fixed reference, and beyond the said point in the winding direction of reel rotation, is an actuating device disposed to be operatively engaged by the securing means, when the securing means is in its radially outward position and the flange and hub are rotated in winding direction, for causing the securing means to move radially inward toward the hub from its position outwardly of the medium, whereby said means engages the medium and moves it toward the hub, said means and/or said device being so constructed as to hold the securing means and the medium on the hub for at least one full revolution of the reel, thereby to effect self-loading of the reel.

Since, in most apparatus of the character to which we have made reference, unwinding of the tape from the reel is effected at relatively high speed, at least as the last few lays of the medium are unwound from the hub, it is one of our objects to take advantage of centrifugal force for the purpose of re-positioning the securing means in its radially outward position, such re-positioning automatically resulting in release of the medium from the reel hub and in conditioning the securing means for the next subsequent loading operation.

In addition to the foregoing, it is an object of our invention to render the described means so completely automatic that the user, in loading the tape or other medium, need not be concerned with anything other than dropping or placing an end portion of the tape in a given spacial location. In view of this objective, it is necessary to correlate the reel to the said spacial location, and of prime importance, to so construct the reel that it is either in a position in which its securing means is disposed to the side of said location opposite the hub, or that its securing means will not interfere with the tape until it is rotated into the described position in winding direction. We prefer to adopt the latter course of construction and in this respect provide a securing means that is adapted to be withdrawn from the hub side of the flange when it is in its radially outward position. Specifically, we provide a slot in the flange extending from the hub outwardly beyond the radial location of reception on the flange of the medium. Within this slot we mount a pin for sliding movement both along the slot and transversely of the flange. The pin normally projects to the hub side of the flange but is adapted to be withdrawn from said side by a cam provided on the opposite side of the flange adjacent the outer end of the slot. By virtue of this construction, centrifugal force consequent upon unwinding of a previously applied medium causes the pin to move radially outward in the slot, whereupon the pin engages the cam and is withdrawn from the hub side of the flange, i.e., the tape receiving space of the reel. Then, as a fresh tape is placed on the flange, the pin, upon rotation in winding direction, is able to move under the tape without disturbing its location until the pin is disposed to the side of the tape opposite the hub. At about this time, the pin operatively engages the actuating device whereby the pin is moved radially inward. As it commences such movement, the pin clears the cam whereupon it moves to the hub side of the flange, engages the tape and moves the tape toward and clamps it to the hub.

As a consequence of its completely automatic operation, the self-loading reel of our invention is adapted to be disposed permanently within the cabinet of, or a like enclosure for, a motion picture film projector, a camera, a tape or wire recorder, or the like. In this connection, it is a secondary object of our invention to provide improved tape as film loading means, including our improved reel, accommodating loading of a camera, tape recorder, or the like by the simple expedients of inserting a supply reel into the cabinet and dropping a lead end portion of the reel carried medium into a slot or passageway in the cabinet.

Our invention also has as objects the provision of means facilitating mounting of a supply reel in apparatus of the character described and elimination of the tortuous path through which the medium has heretofore been required to be threaded; the overall objective being to afford a reel feed mechanism, such as a tape recorder, wherein the same is loaded simply by inserting a supply reel through a slot in the recorder cabinet, unwinding a lead end portion of the tape from the reel and dropping this portion of the tape in a slot or slot-like passageway.

Other objects and advantages of the present invention will become apparent in the following detailed description.

Now, in order to acquaint those skilled in the art with the manner of making and using the reel feed mechanisms of our invention, we shall describe, in connection with the accompanying drawings, a preferred embodiment of our self-loading reel, and, by way of example, a tape recorder wherein the objects of this invention are achieved in their entireties, the following description and the accompanying drawings being directed to embodiments of our apparatus preferred for the handling of magnetic recording tape from which example the applicability of our invention to other fields of use will be apparent.

Figure 1:
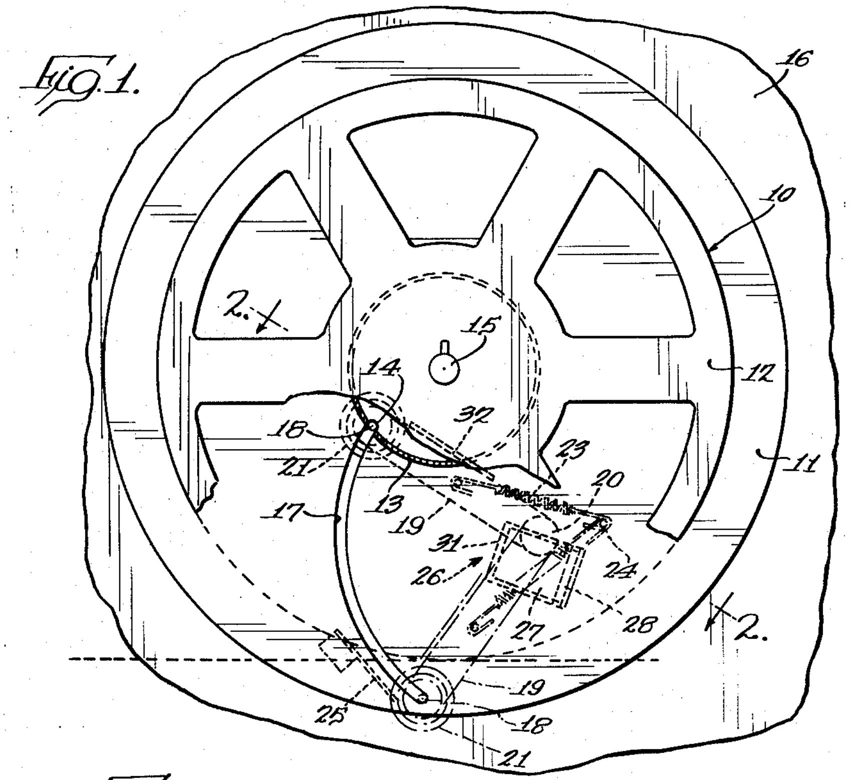
FIGURE 1 is a plan view of the preferred embodiment of our self-loading reel, portions of the reel being broken away to reveal the tape or medium securing means, said means being depicted in dotted lines in its inner or tape clamping position and in dot-dash lines in its outer, or non-clamping, position.
Figure 2:
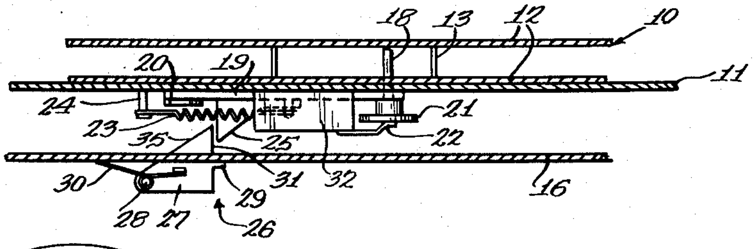
FIGURE 2 is a vertical sectional view of our self-loading reel, the view being taken substantially on line 2—2 of FIGURE 1 and showing the tape securing means in its inner or tape clamping position.

Referring now to the drawings, and particularly to FIGURES 1 and 2, we have illustrated the embodiment of our self-loading reel that is preferred for the handling of magnetic recording tape. In this embodiment, the reel per se comprises a conventionel tape spool 10 and a concentric base flange 11 of a diameter larger than the spool. The spool itself includes flanges 12, one of which lies against the flange 11, and an intervening hub 13 having a slot 14 therein through which the tape has heretofore been required to be threaded. While we prefer to utilize the complete spool 10, it will become apparent as the description proceeds that the reel may simply comprise the hub 13 and the flange 11.

The reel is adapted to be mounted in a conventional manner on an axial drive shaft 15 with its base flange 11 adjacent the deck or supporting structure 16 for the shaft; the shaft in the illustrated construction being adapted to drive the reel in the counter-clockwise direction to wind tape on the reel hub.

The base flange 11 and the adjacent spool flange 12 are provided with a slot 17 communicating at its inner end with the slot or recess 14 in the reel hub and extending outwardly therefrom to adjacent the periphery of the flange 11 at a location outwardly of the flanges 12 of the spool 10. To facilitate operation of the reel loading mechanism, the slot is preferably arcuate, extending generally radially from the hub and then forwardly in the take-up or winding direction of reel rotation, the said radial portion thereof constituting the trailing end of the slot. More specifically, the slot constitutes an arc of a circle struck from an axis disposed forwardly of the slot and intermediate the hub and periphery of the reel.

The slot 17 is adapted for reception therein of a tape securing finger means which in the illustrated embodiment comprises a headed pin 18 mounted for sliding movement in the slot and for movement transversely of the flange 11 into and out of the tape receiving space defined to the upper side of the flange 11. The pin 18 is carried by an arm 19 which is pivotally mounted by means of a pivot pin 20 on the lower side of the flange 11 on an axis coincident with the axis of the arc of the slot 17. The pin is slidably mounted in a bore adjacent the free end of the arm 19 with the head 21 thereof disposed beneath or to the deck side of the arm. A leaf or wire spring 22, fixed at one end on the arm 19, engages the head 21 of the pin and normally biases the shank of the pin through the slot 17 and into the tape receiving space of the reel means, the shank of the pin being of a length to terminate, in its normal position, in slightly spaced relation to the upper or remote flange 12 of the reel and being of a diameter to enter the recess 14 in the hub 13.

The arm 19 is selectively biased to the opposite ends of the slot 17 by means of a tension spring 23 which is mounted in toggle relation to the arm. One end of the spring is attached to the arm and the other end thereof is anchored on a pin 24 that is secured to the lower or deck side of the flange 11 in alignment generally with the pivot pin 20 and the central portion of the arcuate slot 17, thereby to bias the arm toward one or the other end of the slot depending on the location of the pin 18 at a given time.

Adjacent the outer end of the slot 17, the flange 11 carries on the lower or deck side thereof a cam 25 having a ramp surface disposed in the path of movement of the head 21 of the tape securing pin. As the pin moves toward the outer end of the slot 17, the cam 25 is engaged by the head of the pin and causes the pin to be moved toward the deck 16 transversely of the flange 11 to withdraw the shank of the pin from the tape receiving space of the reel, and thereby to accommodate rotation of the pin past (under) a tape received on the unobstructed marginal edge portion of the flange 11 without displacing the tape, the pin being releasably retained in such inoperative position by the toggle spring means 23.

As thus far described, the reel could be loaded by manual initiation of inward movement of the tape securing means. Specifically, by placing the lead end portion of a tape on the exposed upper marginal surface portion of the flange 11, rotating the reel to dispose the pin to the side of the tape opposite the hub, and imparting a sharp blow to the radially outwardly extending portion of the head 21 of the pin 18 (see FIGURE 1), the pin would be caused to move inward toward the hub 13, whereupon the shank of the pin would enter into the tape receiving space of the reel, engage the tape, move it toward the hub and clamp it to the hub. However, in most apparatus fed by reel carried mediums, the take-up reel is normally located on a fixed axis and the medium is conducted thereto in a given path, the medium extending generally tangent to the winding surface of the reel along a line from the last support or guide for the medium to the forwardmost point of tangency on the winding surface in the direction of reel rotation. Thus, the medium is always led to the reel and engaged therewith at a spacial location having a fixed relation to the fixed axis of reel rotation.

In view of the described relationship, means for rendering the tape or medium securing means 18 automatically operative at the appropriate time in the cycle of reel operation may also have a fixed relation to the axis of reel rotation and the location or point of tape reception on the exposed marginal portion of the flange 11. Assuming that the tape in the preferred embodiment of our invention, as illustrated in FIGURE 1, is manually conducted generally horizontally from the left of FIGURE 1 across the lower edge portion of the reel generally tangent to the flange 12 of the spool 10, as indicated by the dotted horizontal line, the means 26 that we prefer to employ for initiating the tape loading operation is mounted on the deck 16 at a location forwardly in the direction of reel rotation of the point of reception on the flange 11 of the lead end portion of the tape.

The means 26 in the illustrated embodiment of the invention comprises a retractable cam 27 pivotally mounted on a pin 28 supported to the lower side of the deck 16, the cam normally extending upwardly through a hole in the deck to a position determined by a stop 29 and being biased to such position by a spring 30. At the face thereof encountered in the take-up or winding direction of reel rotation, the cam 27 defines a vertical abutment surface 31 engageable by a vertically depending flange 32 on the pin carrying arm 19 when the pin is adjacent the outer end of the slot 17. The cam is located forwardly of the point of reception on the flange 11 of the lead end portion of the tape in the take-up direction of reel rotation in such relation to the arm 19 that when the pin 18 comes adacent but radially outwardly of said point, the flange 32 on the arm engages the abutment face 31 of the cam. The cam 27 and its mounting pin 28 face generally at an angle of about 30 degrees relative to the radius of the reel that intersects the said point, whereby the abutment face 31 thereof cams the arm 19 toward the hub 13, the respective lengths of the face 31 and flange 32 being such that the cam moves the arm overcenter in the direction toward said hub, whereupon the toggle spring 23 moves the arm 19 to bring the shank of the pin 18 into engagement in the recess or slot 14 in the hub.

During the initial portion of the movement caused by the cam 27, the head 21 of the pin 18 is separated from the pin withdrawing cam 25, whereupon the spring 22 moves the pin through the flange 11 at a point radially outwardly of the tape received on the flange. As rotation continues, the pin is swung inwardly to engage the tape and move the tape toward the hub 13, the pin ultimately clamping the tape to the hub. Due to the fact that the shank of the pin 18 enters the recess 14, the tape has a 180 degree wrap about the pin with a right angle crimp therein so that the same is firmly clamped to the hub to prevent slippage of the tape and thereby automatically to load or feed the lead end portion of the tape onto the hub of the reel.

The speed of rotation of the reel in take-up or winding direction usually is relatively slow, and the curvature of the slot mitigates the effect of centrifugal force in the take-up direction, so that the arm is readily retained in clamping position for at least one revolution of the reel. As the pin 18 passes the point of engagement with the hub of the on-coming tape, the pin is confined between the first and second lays of tape on the hub, thereby to be held firmly in clamping position during operation of the reel in take-up direction. In clamping position, the flange 32 of the arm 19 is so located that its path of rotation does not intersect the deck carried cam 27, as is clearly shown in FIGURE 1, and winding of the tape onto the reel proceeds in a conventional manner.

Figure 3:
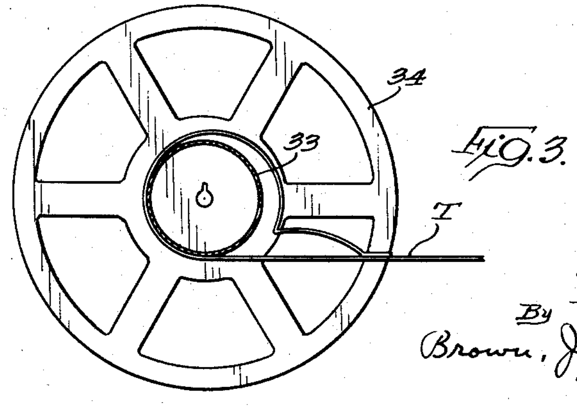
FIGURE 3 is a sectional view of a supply reel illustrating one manner in which a tape may be permanently associated therewith for use in conjunction with the self-loading reel of our invention.

In apparatus such as tape or wire recorders and motion picture film projectors, the medium, after it has been recorded on or reproduced, must be rewound on its supply reel for subsequent reproduction. In such apparatus, our self-loading reel is preferably employed as the take-up reel, in which use it serves only as a temporary storage means for the medium. In view of its self-loading capability and the nature of its use, the reel mechanism of our invention may be permanently associated with apparatus of this character. Because of such mounting, and especially in keeping with our general objective of eliminating or minimizing manual handling of the medium, it is desirable that the medium be permanently associated at its trailing end with its supply reel so that there will be no need for reverse or rewind threading of the medium. One suitable way of accomplishing such result is shown in FIGURE 3, wherein the trailing end portion of a tape T is looped about the hub 33 of its supply reel 34 and secured upon itself. By virtue of such mounting, the tape and the take-up reel will simply stop when the tape has been reproduced. Subsequently, when driving of the take-up reel is discontinued and the supply reel 34 is rotated in rewind direction, sufficient friction exists between the tape and the hub of the supply reel to facilitate prompt commencement of the rewinding operation without necessity for reverse threading of the tape. In addition, or alternatively, as well known in the art, the tape T may carry contact segments adjacent the trailing end thereof engageable with cooperable tape engaging contact means (not shown) for automatically closing an electric circuit upon completion of the reproducing cycle, which circuit in turn will automatically initiate the rewind operation, thereby causing the tape to be rewound on the supply reel entirely automatically.

As the tape which has been wound onto the take-up reel 10—11 is rewound onto the supply reel 34, the reels are both rotated at relatively high speed and the take-up reel is rotated progressively faster due to the progressive increase and decrease, respectively, in the effective diameter of the winding surface of the reel 34 and the surface from which the tape is being unwound from the reel 10—11. Consequently, as the second lay of tape on the hub 13 of the spool 10 is unwound and releases the pin 18, the pin 18 and its supporting arm 19 are subjected to a centrifugal force that is considerably greater than the force created upon rotation of the reel in the take-up direction. By appropriate adjustment of the tension on the spring 23, the pin 18 is rendered responsive to this greater centrifugal force to be swung automatically toward the outer end of the slot 17, the spring 23, after passage of the pin 18 overcenter, assisting in moving the pin outwardly and retaining the same in the outer end of the slot. Thus, the lead end portion of the tape is automatically released from the reel and the loading mechanism thereof conditioned for the next subsequent tape loading or feeding operation.

As the arm 19 is swung outwardly, the flange 32 thereof is moved to a position in which its path of rotation intersects the deck carried cam 27, the flange in this instance rotating in the rewind direction. The face 35 of the cam 27 encountered in this direction of rotation comprises an inclined ramp which, upon being engaged by the flange 32, causes the cam 27 to be depressed or retracted against the normal bias of the spring 30, thereby permitting the flange to pass over the cam without actuating the arm 19 or stopping the reel, to accommodate complete unwinding of the tape.

After the rewinding operation has been completed, and it is then desired to replay the tape, or to play back a recording made thereon, or to play or record on a fresh tape, it is only necessary to unwind the lead end portion of the tape from the supply reel 34, and to place this portion of the tape onto the flange 11 along the path indicated by dotted lines. Then, by simply initiating rotation of the reel 10—11 in take-up direction (counterclockwise), the tape will be fed automatically onto the take-up reel in the manner above described.

Thus, it is apparent that the self-loading reel mechanism of our invention is completely automatic in operation, the mechanism upon rotation in take-up direction automatically securing the lead end of a tape to its hub, and upon rotation in the rewind direction automatically releasing the tape and conditioning itself for the next subsequent loading operation. By virtue of these capabilities, our self-loading reel accommodates specific additional improvements in tape recorders, movie film projectors and the like. By way of example, these improvements are illustrated in FIGURES 4 to 7 as embodied in a tape recorder.

Figure 4:
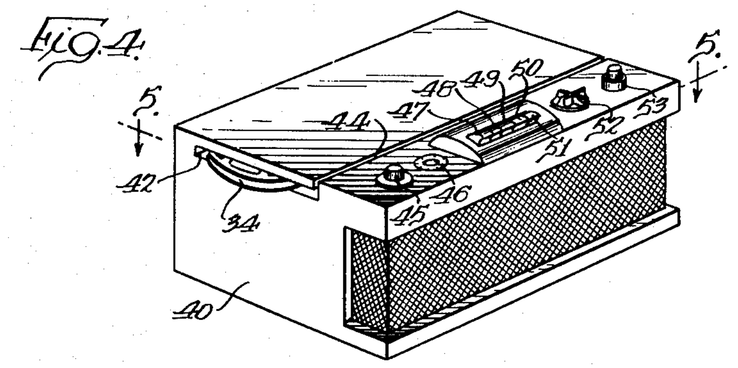
FIGURE 4 is a perspective view of the exterior of a tape recorder embodying our invention.
Figure 5:
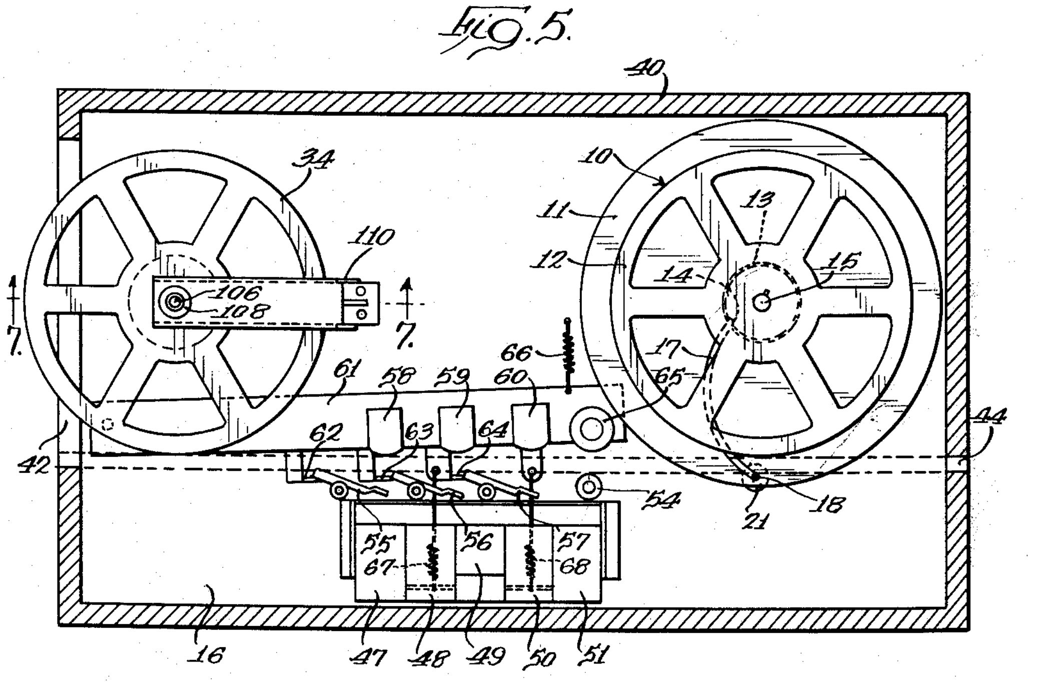
FIGURE 5 is a horizontal section of the tape recorder, taken substantially on line 5—5 of FIGURE 4 and on an enlarged scale, showing in plan our improved tape loading means, the view showing the recorder in "stop" position.
Figure 6:
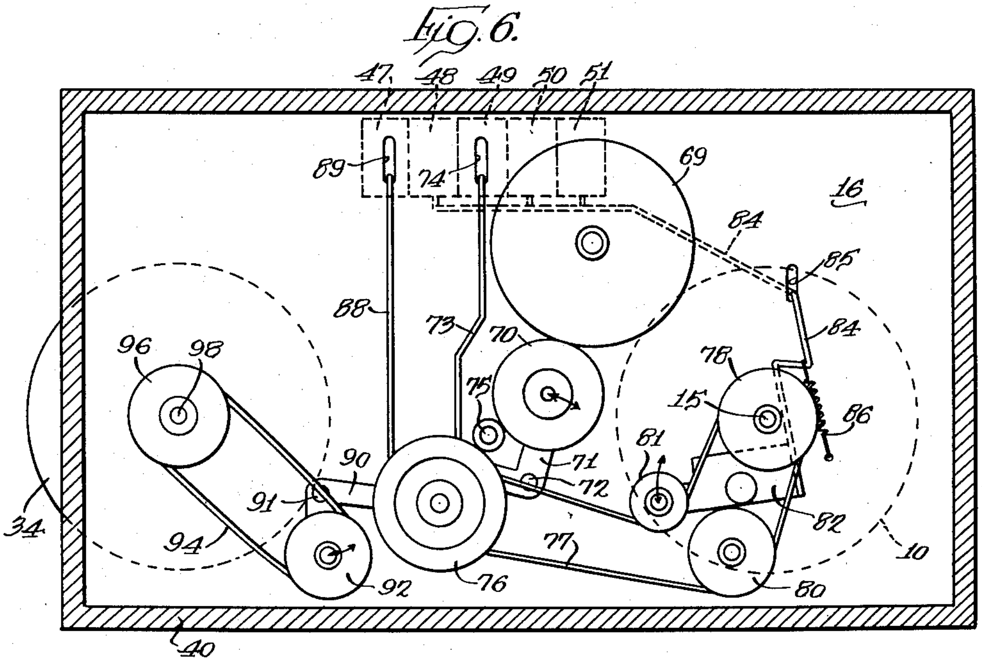
FIGURE 6 is a bottom view of the reel driving and control means of the tape recorder, the view showing said means in the "record" or "play" position.

Referring now to FIGURES 4 to 6, we have illustrated a tape recorder that is of generally known external appearance except that its cabinet 40 is provided with a supply reel loading slot 42 in one side wall thereof and a tape guide slot 44 across the top thereof. The recorder is equipped with the usual control means including an on-off switch 45, a tape counter or index 46, a series of push button controls including a "rewind" control 47, a "record" control 48, a "stop" button 49, a "play" control 50 and a "fast-forward" take-up control 51, a distortion indicator 52 and a volume or tone control 53.

Within the interior of the cabinet 40, the recorder includes a mounting deck or supporting part corresponding to the part 16 previously described. This deck provides a principal support for the components of the recording-reproducing mechanisms. The control means above described have a suitable mounting on and extend to the upper side of the deck 16 as is known in the art. Also disposed to the upper side of the deck are a rotatable tape driving capstan 54 and a plurality of spring biased, pivotally mounted pressure pad arms 55, 56 and 57. Each of the arms is adapted to cooperate with electromagnetic head means, namely, an erase head 58, a record-play head 59 and binaural play head 60, respectively. The three heads are fixed to a bar 61 which is pivotally mounted at one end thereof on the upper side of the deck 16 to accommodate movement of the heads toward and away from the respective pressure pads. The head bar 61 also carries cam means 62, 63, and 64 engageable with the arms 55, 56 and 57, respectively, for moving the pressure pads against the bias of their spring means in the direction away from the heads when the heads are moved away from the pads. Adjacent its free end, the bar mounts a rotatable pressure roller 65 which is adapted to cooperate with the capstan 54 to hold a tape in driving engagement with the capstan. As thus associated, the heads and pressure roller 65 and the pressure pad arms and capstan 54, in the retracted position of the head bar 61, define between themselves a slot-like passageway for insertion of a magnetic recording tape, the tape being gripped between the rollers and being engaged at the opposite sides thereof by the pads and heads when the bar is moved toward said pads and capstan to its operative position.

The head bar 61 is normally biased away from the pressure pads and capstan by a spring 66 so that the tape is not gripped by the capstan when any one of the "stop," "rewind" and "fast-forward" controls 49, 47 and 51, respectively, is depressed. Conventional cooperating means (not shown) are provided on the push buttons so that as one button is depressed, all of the other buttons are released. Each of the "record" and "play" control buttons 48 and 50 is provided with a spring 67 and 68, respectively, extending between the respective button and the head bar 61, so that as either button is depressed, the respective spring 67 or 68 is tensioned to such extent as to overcome the normal bias of the spring 66, thereby to draw the head bear into its operative position as above described.

The capstan 54 includes a shaft journalled on the deck and extending to the lower side thereof and carrying at its lower end a flywheel 69. The flywheel is adapted to be rotated by virtue of peripheral engagement with the periphery of a capstan idler 70, which is rotatably mounted on a crank 71, which in turn is pivotally mounted at 72 on the lower surface of the deck 16. At the end thereof opposite the idler 70, the crank is connected to a control rod 73 which extends to the forward edge of the deck 16 and upwardly through a slot 74 to the "stop" button 49. In use, when the "stop" button is depressed, the rod 73 is moved forwardly (toward the top side of FIGURE 6) to swing the crank 71 in a clockwise direction as viewed in FIGURE 6, thereby to disengage the idler 70 from the flywheel 69. When the "stop" button is released, the crank is pivoted in the opposite direction to engage the idler with the flywheel and with the shaft 75 of an electric motor (not shown) thereby to effect rotation of the capstan.

The shaft 75 of the motor also normally drives, by peripheral engagement, a take-up driver 76 carried by a shaft that is journalled on the lower side of the deck. The take-up driver is operatively connected by means of a normally relaxed or untensioned pulley belt 77 to a pulley 78 fixed to a take-up reel shaft which corresponds to the shaft 15 and extends through the deck 16 to the upper side thereof. The belt 77 passes over and is guided by an idler sheave 80 and is adapted to be tensioned by means of a tension roller 81 rotatably mounted on a swingable crank or lever 82. The lever 82 is adapted to be actuated by a control rod 84 which extends through a slot 85 in the deck 16 to each of the "record," "play" and "fast-forward" buttons 48, 50 and 51 to be actuated upon depression of any one of said buttons, the rod normally being biased by a spring 86 to a position relieving tension on the belt.

In use, when either the "record" button 48 or the "play" button 50 is depressed, the head bar 61 is shifted to its operative position, whereby a tape may be gripped between the capstan 54 and the pressure roller 65 to constitute the primary drive for the tape. Release of the "stop" button 49 as caused by depressing either of the buttons 48 or 50, results in movement of the idler 70 into driving position between the motor shaft 75 and the flywheel 69 thereby to effect rotation of the capstan at a predetermined speed. At the same time, the control rod 84 is shifted forwardly to cause the roller 81 to tension the belt 77 whereby the take-up shaft 15 is frictionally driven for the purpose of taking up the tape from the capstan 54, the frictional drive accommodating slippage so as not to overcome the capstan drive of the tape and to effect only a take-up of the tape already passed by the capstan. As is known in the art, depression of the respective button 48 or 50 also controls electric means (not illustrated) for conditioning the heads 58, 59 and 60 for the purpose of recording on a tape, or reproducing a previously recorded program.

Depression of the "fast-forward" push button 51 results in freeing the head bar 61 whereupon the spring 66 returns the bar to its normal position, as illustrated in FIGURE 5, if the same is not already in such normal position. This manual act also results in maintaining or moving the control rod 84 forwardly to cause the roller 81 to tension the belt 77, whereupon the take-up shaft 15, since the friction drive means is not restrained by the capstan drive, will be rotated at relatively high speed rapidly to take-up tape and move the same in forward direction.

To effect rewinding of the tape, the "rewind" push button control 47 is operatively connected to control rod 88 which extends through a slot 89 in the deck 16 and to a crank 90 that is pivotally mounted at 91 on the lower surface of the deck. The crank supports a rotatable rewind driver 92 and is adapted, upon pivotal movement, to move the driver 92 into and out of peripheral engagement with the take-up driver 76. The rewind driver 92 is operatively interconnected, by means of a normally relaxed pulley belt 94, with a pulley 96 which is secured to a rewind or supply reel shaft 98, the shaft 98 being rotatably supported on the deck 16 and extending to the upper side thereof. The reel drive shafts 15 and 98 are disposed in a common vertical plane substantially paralleling the slot-like passageway between the electromagnetic heads and their pads, which plane and passageway are also preferably parallel to the front wall of the cabinet 40.

Upon depression of the "rewind" push button 47, the rod 88 is shifted forwardly to swing the driver 92 into engagement with the driver 76 and to tension the belt 94 whereupon the take-up driver 76, due to its engagement with the motor shaft 75 and the relative sizes of the two drivers, imparts high speed rotation to the supply reel shaft 98 in the proper direction to effect rewinding of the tape. During such operation, the head bar 61 is retained in its normal or retracted position by the spring 66.

When the "stop" push button 49 is depressed, any of the other buttons that was depressed is immediately released and the drive connections to the reel drive shafts 15 and 98 are automatically rendered inoperative. Also, the head bar 61 is released and the idler 70 is shifted out of engagement with the motor shaft, thereby to stop mechanical operation of the recorder. In addition, it is conventional in the art to include in the recorder suitable brake means (not shown herein) for each of the reel shafts 15 and 98, which means are rendered operative upon depression of the "stop" button and rendered inoperative upon depression of any one of the other buttons, the brake means preventing overrunning of the shafts, particularly upon cessation of the fast-forward and rewind operations.

As thus far described, with the exception of the slots 42 and 44 and the specific location of parts, the recorder is generally of a known or conventional construction and has been described only to the extent necessary to a complete and accurate understanding of our invention. Modified and/or other recorder constructions known to the art may be employed with equal facility in attaining the improvements afforded by our invention, which improvements will now be described in detail.

According to the present invention, we first provide in the recorder, as the take-up reel thereof, our self-loading real mechanism 10—11 previously described in connection with FIGURES 1 and 2. The tape receiving spool 10 of the reel mechanism is of a diameter equal to the largest diameter supply reel to be handled by the recorder, and the reel and its drive shaft 15 (the take-up reel drive shaft) are so located that the slot-like passageway defined between the head bar 61 and capstan 54 of the recorder is substantially tangent to the flanges 12 of the spool 10. The take-up reel 10—11 preferably has permanent association with its drive shaft 15 and is fully enclosed by the cabinet 40.

The slot 44 provided according to our invention in the cabinet 40 is aligned vertically with the said passageway between the head bar and capstan, whereby this slot accommodates vertically downward access to the said passageway and the exposed marginal edge portion of the flange 11 of the selfloading reel. At its left-hand end, as viewed in FIGURE 5, the slot 44 communicates with the forward edge of the slot 42 provided in the side wall of the cabinet 40, which latter slot is intended to accommodate insertion therethrough of a supply reel of tape.

Figure 7:
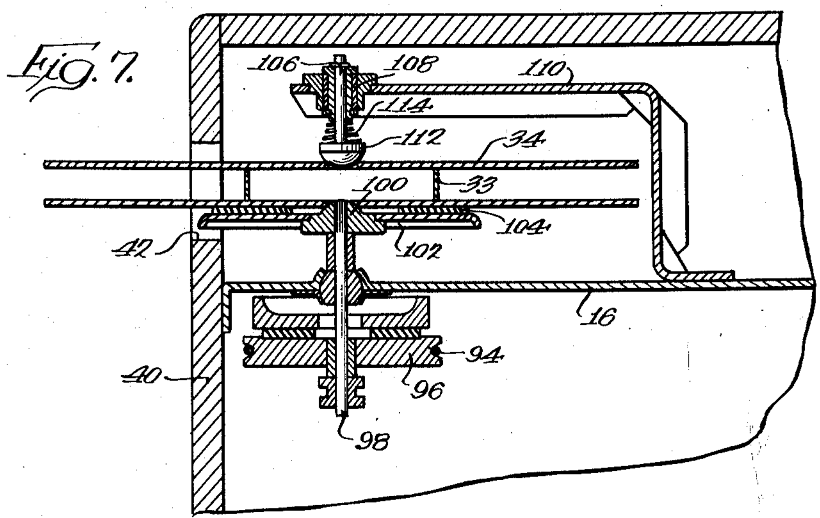
FIGURE 7 is a fragmentary vertical section of the recorder, taken substantially on line 7—7 of FIGURE 5 and on a further enlarged scale, showing the supply reel mounting means provided according to our invention.

As a further feature of our invention, we provide within the cabinet 40 adjacent the slot 42, means facilitating mounting and accurate positioning of the supply reel. As shown in FIGURES 5 and 7, the supply or rewind reel shaft 98 is disposed closely adjacent and parallel to the side of the cabinet 40 in which the slot 42 is formed. At its upper end, above the deck 16, the shaft 98 carries an aligning button 100 including a parti-spherical head and a radially extending flange. The button is disposed in horizontal alignment with the slot 42 and is aligned substantially with the vertical center line of the slot. The flange of the button carries a driving disc 102, which may suitably extend into the slot 42 and which is provided with an annular disc 104 of friction material on its upper surface, the upper surface of the friction disc being disposed just below the top of the button's head. Disposed in axially aligned upwardly spaced relation to the shaft 98 is a pin or stub shaft 106 which is mounted for rotation and axial movement in a bearing 108 carried by a supporting bracket 110. This pin or stub shaft is provided at its lower end with an aligning button 112, and a compression spring 114 is confined between said button and said bearing for normally biasing the button 112 toward the button 100, the normal spacing between the aligning buttons being less than the thickness of a standard reel. The supporting bracket 110 includes an elongate horizontal portion of a length greater than the radius of the largest reel to be handled, which portion preferably extends inwardly of the cabinet perpendicular to the side thereof and in alignment with the vertical center line of the slot 42. At its inner end, the bracket includes depending portions which are fixed to the deck 16, thereby to afford a secure mounting for the axially movable button 112.

By virtue of the described structure, the supply reel 34 of recording tape or a like reel-carried medium can be properly located relative to the supply reel drive shaft 98 in driving engagement therewith by the simple expedient of sliding the reel edgewise through the slot 42. As the reel engages the aligned buttons 100 and 112, the spherical surfaces of the buttons act as cams causing the button 112 and its shaft 106 to be moved upwardly to accommodate entry of the reel between the buttons. As the reel is moved inwardly of the cabinet, the axial openings in the flanges thereof are brought into general alignment with the shafts 98 and 106, whereupon the aligning buttons enter into said openings and by virtue of their spherical surfaces center the reel on said shafts. As the button 100 enters into the axial opening in the adjacent flange of the reel 34, the reel is permitted to move downwardly relative thereto to bring the reel into engagement with the friction disc 104, the reel thereafter being resiliently held in driving engagement with the disc and the driveshaft 98 by the button biasing spring 114. As illustrated, the shafts 98 and 106 are located sufficiently close to the side of the cabinet that a reel of the smallest diameter to be handled by the recorder will project outwardly of the cabinet to facilitate loading and unloading of the reel.

Another feature of our invention resides in the location of the shafts 98 and 106 in the same vertical plane as the take-up drive shaft 15 and in such position relative to the slot-like passageway between the head bar 61 and capstan 54 that said slot-like passageway will be substantially tangent to the peripheral edge of the largest diameter supply reel to be carried by the shafts. This results in a substantially straight line path for the tape during loading, with which path the slot 44 communicates. Thus, loading of a tape into the recorder involves simply the manual steps of slipping the supply reel through the slot 42, unreeling the lead end portion of the tape from the reel, and dropping said lead end portion into the slot 44 along the full length thereof. Preferably, the slot 44 extends into the opposite side wall of the cabinet 40 to facilitate positoning of the lead end portion of the tape in the slot.

By virtue of the two described manual acts, the supply reel is positioned in driving engagement with the rewind shaft, the tape is threaded through the recording-reproducing and tape drive means, and the lead end portion of the tape is deposited on the flange 11 of the self-loading reel 10—11 in the proper position to be automatically loaded therein. Consequently, the operator need thereafter simply depress the "record" or "play" button 48 or 50 to start the recorder in operation. When the tape has been recorded on or reproduced, the tape stops, due to its mounting on the supply reel 34 as illustrated in FIGURE 3, whereupon the "rewind" cycle is initiated either manually or automatically in the manner described. As the tape is rewound onto the supply reel, the self-loading reel rotates progressively faster so that as the second to last lay of tape thereon leaves its hub, the tape securing means automatically releases the tape and conditions itself for the next loading operation. Accordingly, the only acts required to be performed by the user are (1) to remove and insert supply reels through the slot 42, (2) unwind the lead end portion of the tape from the supply reel and drop it in the slot 44, and (3) depress the push buttons 47—51 in appropriate sequence.

Thus, the objects of the present invention have been shown to be achieved in a highly convenient, economical andn practical manner. The apparatus described may be used with equal facility in either the horizontal position illustrated or in a vertical position, and in either position will perform its described functions in a fully practical manner whether the medium employed be tape, movie film, wire, or other reel or spool carried mediums. In vertical installations wherein the supply reel is disposed uppermost, and the tape is subject to the force of gravity, the slot 44 may be replaced by a vertical passage open only at its upper end. Also, the supply reel mounting means and the self-loading take-up mechanisms may be employed independently of one another if desired. In this respect, the take-up reel mechanism could, for example, be employed in conjunction with the industrial winding of tape or a like medium onto supply reels, such as must be done by manufacturerers of the medium. In such cases, the lower flange of the reel or spool would preferably have a readily detachable connection with the flange 11 and its associated mechanism whereby, after the medium was loaded on one supply reel or spool, the reel or spool could be detached from the flange (whereupon the pin 18 would slide out from between the lays of the medium), thus freeing the mechanism for feeding a fresh leading end portion of the medium onto a second supply reel subsequently associated with the flange.

Accordingly, while we have described what we regard to be the preferred embodiments of our supply reel mounting means and our self-loading take-up reel mechanism, and a preferred form of device embodying in the entire concept of the present invention, it is to be appreciated that various changes, rearrangements, and modifications may be made in such preferred embodiments without departing from the scope of the invention, as defined by the appended claims.

We claim:

1. A self-loading reel for tape and the like comprising a hub on which tape is to be wound, a flange secured to one side of said hub for receiving on the hub side thereof the lead end portion of a tape, said flange including guide means extending outwardly from said hub to beyond the point of reception thereon of the lead end portion of the tape, tape securing means on the hub side of said flange guided by said guide means for movement from the outer end portion of said guide means to said hub for moving the lead end portion of the tape to the hub and for clamping it to the hub, said tape securing means being movable in the opposite direction for releasing the tape from the hub and for conditioning itself for a subsequent tape loading operation, and means adjacent the outer end of said guide means for withdrawing said tape securing means from the hub side of said flange when the tape securing means is in the outer end portion of said guide means for accommodating rotation of the reel to a position wherein said tape securing means is disposed outwardly of a tape received on said flange without displacing the tape.

2. A self-loading reel for tape and the like comprising a hub on which tape is to be wound, a flange secured on one side of said hub for receiving on the hub side thereof the lead end portion of a tape, said flange including guide means extending outwardly from said hub to beyond the point of reception thereon of the lead end portion of the tape, tape securing means on the hub side of said flange guided by said guide means for movement from the outer end portion of said guide means to said hub, and means effective upon rotation of the reel in take-up direction for moving said tape securing means inwardly from a position at the outer end of said guide means and outward of the lead portion of a tape received on said flange to move said tape portion to the hub and clamp it thereagainst, said moving means including means engageable by the securing means at said position thereof upon said reel rotation and means for urging the securing means inwardly, said tape securing means being movable in the opposite direction for releasing the tape from the hub and for conditioning itself for a subsequent tape loading operation.

3. A self-loading reel for tape recorders and the like comprising a hub on which tape is to be wound, a flange secured to one side of said hub for receiving on the hub side thereof the lead end portion of a tape, said flange having a slot therein extending outwardly from said hub to beyond the point of reception thereon of the lead end portion of the tape, tape securing means including a portion slidably mounted in said slot and extending to the hub side of said flange, and means cooperable with said tape securing means for positioning the same adjacent the outer end of said slot and to the side of said point opposite said hub and for causing the same to move inwardly toward said hub to engage the lead end portion of the tape and secure the tape to said hub, said cooperable means including means for selectively biasing the securing means toward the outer and inner ends of said slot, and means engageable by the securing means upon reel rotation in take-up direction for urging the securing means toward the hub when the securing means is located adjacent the outer end of said slot.

4. A self-loading take-up reel comprising a hub, a flange secured to one side of said hub, said flange having a slot therein extending from said hub to adjacent its periphery, finger means including a portion slidably mounted in said slot and for movement transversely of said flange, said portion of said finger means normally projecting through said slot to the hub side of said flange, and means cooperable with said finger means when said portion thereof is adjacent the outer end of said slot for withdrawing said portion from the hub side of said flange.

5. A self-loading reel for tape recorders and the like comprising a hub, a flange secured to one side of said hub, said flange having a slot therein extending from said hub to adjacent its periphery, a pin slidably mounted in said slot for movement toward and away from said hub and for movement transversely of said flange, means biasing said pin toward the hub side of said flange, means biasing said pin selectively toward said hub and toward the outer end of said slot, said pin having a head to the side of said flange opposite said hub, and a cam fixed to said opposite side of said flange adjacent the outer end of said slot and in the path of movement of the head of said pin for withdrawing said pin from the hub side of said flange when the pin is in the outer end of said slot.

6. In a tape recorder or the like having a supporting structure and a take-up reel drive shaft projecting from said structure, the improvement comprising a self-loading take-up reel mounted on said shaft and including a hub, a flange secured to one side of said hub adjacent said supporting structure, said flange having a slot therein extending from said hub to adjacent its periphery, finger means including a portion slidably mounted in said slot, and means mounted at least in part on said supporting structure adjacent said flange in the path of rotation of said finger means when the same is in the outer end of said slot and said reel is rotated in take-up direction for moving said finger means toward said hub and for retaining the same in engagement with said hub for at least one revolution of said reel in take-up direction.

7. In a tape recorder or the like having a supporting structure and a take-up reel drive shaft projecting from said structure, the improvement comprising a self-loading reel mounted on said shaft and including a hub, a flange secured to the side of said hub adjacent the supporting structure, said flange having a slot therein extending from said hub to adjacent its periphery, a pin slidably mounted in said slot for movement toward and away from said hub and for movement transversely of said flange, means biasing said pin toward the hub side of said flange, means biasing said pin selectively toward said hub and toward the outer end portion of said slot, said pin having a head to the side of said flange opposite said hub, a cam fixed to said opposite side of said flange adjacent the outer end portion of said slot and in the path of movement of the head of said pin for withdrawing the head of said pin from the hub side of said flange when the pin is in the outer end portion of said slot, and a cam mounted on said supporting structure adjacent said flange in the path of rotation of said pin when said pin is in the outer end portion of said slot and said reel is rotated in take-up direction for initiating movement of said pin toward said hub.

8. In a tape recorder or the like having a supporting structure and a take-up reel drive shaft projecting from said structure, the improvement comprising a self-loading take-up reel mounted on said shaft and including a hub on which tape is to be wound, a flange secured to one side of said hub adjacent said supporting structure for receiving on the hub side thereof the lead end portion of a tape, said flange having a slot therein extending outwardly from said hub to beyond the point of reception thereon of the lead end portion of the tape, finger means including a first portion slidably mounted in said slot and for movement transversely of said flange, said first portion of said finger means normally projecting through said slot to the hub side of said flange, cam means adjacent the outer end of said slot on the side of said flange opposite said hub, said finger means including a second portion on said opposite side of said flange cooperable with said cam means for withdrawing said first named portion of said finger means from the hub side of said flange when said first portion is in the outer end of said slot, and means mounted at least in part on said supporting structure adjacent said flange in the path of rotation of said finger means when said portion thereof is in the outer end of said slot and the reel rotated in take-up direction for moving said finger means toward said hub, whereby said first named portion of said finger means is caused to move to the hub side of said flange, engage the tape, move the tape to said hub and clamp the lead end portion of the tape to said hub.

9. A reel comprising a hub, a flange secured to one side of said hub, an arm pivoted on said flange outwardly of said hub to the side of said flange opposite said hub, said flange to the outer side of said hub having an arcuate slot therein concentric with the pivot axis of said arm, a headed pin slidably mounted on said arm for movement transversely of the plane of said flange, said pin being aligned with said slot and normally projecting therethrough to the hub side of said flange, a cam on said flange to said opposite side thereof adjacent the peripherally outward margin of said slot in the path of movement of the head of said pin for withdrawing said pin at least to the extent that the same does not project to the hub side of said flange, and a toggle spring connected at one end to said arm and anchored at its other end on said flange at a point aligned approximately with the midportion of said slot and the pivot axis of said arm for selectively biasing said pin toward the inner and outer margins of said slot.

10. In a tape recorder or the like having a cabinet, and including within the cabinet, record-playback means, a take-up reel drive shaft and means for rotatably supporting a supply reel of tape, the improvement comprising a passageway in the cabinet aligned with the record-playback means and extending from adjacent the supply reel supporting means to adjacent the take-up reel shaft, a take-up reel on the shaft within the cabinet, said reel including a hub and a flange secured to one side of said hub which communicates at the hub side thereof with said passageway, said passageway guiding the lead end portion of a tape from the supply reel through said record-playback means and onto the hub side of said flange, and means on said flange operative upon rotation of the reel in take-up direction for automatically clamping the lead end portion of the tape to said hub, whereby the recorder, after insertion of a supply reel therein, is loaded simply by inserting the lead end portion of the tape through said passageway.

11. In a tape recorder or the like having a cabinet, record-playback means in the cabinet, and take-up and rewind drive means in the cabinet, the improvement comprising, in combination, a supply reel loading slot in said cabinet adjacent said rewind drive means, means within said cabinet aligned with said slot and associated with the rewind drive means for automatically centering and mounting a supply reel of tape inserted through said slot on the rewind drive means in driving engagement therewith, passage means in the cabinet aligned with the record-playback means, and communicating with said slot for guiding the lead end portion of the tape from the supply reel through said record-playback means, said passage means extending to adjacent the take-up drive means, and a self-loading take-up reel associated with the take-up drive means within the cabinet, said reel including a hub, flange means secured to one side of said hub communicating with said passage means for reception on the hub side thereof of the lead end portion of the tape, and means carried at least in part by said flange for automatically securing the lead end portion of the tape to said hub upon rotation of the take-up reel in take-up direction, whereby the recorder is loaded simply by inserting a supply reel of tape through said slot and extending the lead end portion of the tape through said passage means.

12. In a tape recorder or the like having a cabinet, record-playback means in the cabinet, and take-up and rewind drive means in the cabinet, the improvement comprising, in combination, passage means through the cabinet aligned with the record-playback means for guiding the lead end portion of a tape from a supply reel through said record-playback means, said passage means extending to adjacent the take-up drive means, a take-up reel mounted on the take-up drive means within the cabinet and communicating with said passage means, and a self-loading mechanism for said take-up reel carried at least in part by said reel for automatically securing the lead end portion of the tape to said take-up reel upon rotation of said reel in take-up direction, said mechanism being responsive to rotation of said take-up reel in rewind direction for releasing the lead end portion of the tape and conditioning itself for subsequent repetition of its tape securing function when said take-up reel is again rotated in the take-up direction.

13. In a tape recorder or the like having a cabinet, record-playback means in the cabinet, drive means in the cabinet for taking up tape from said record-playback means at a relatively slow rate, and drive means in the cabinet for rewinding the tape on a supply reel at a relatively fast rate, the improvement comprising, in combination, a supply reel loading slot in said cabinet adjacent the rewind drive means, means within said cabinet aligned with said slot and associated with the rewind drive means for automatically centering and mounting a supply reel of tape inserted through said slot on the rewind drive means in driving engagement therewith, passage means through the cabinet aligned with said record-playback means and communicating with said slot for guiding the lead end portion of the tape from the supply reel through said record-playback means, said passage means extending to adjacent the take-up drive means, a take-up reel mounted on the take-up drive means within the cabinet and communicating with said passage means, and a self-loading mechanism for said take-up reel carried at least in part by said reel for automatically securing the lead end portion of the tape to said take-up reel upon rotation of said take-up reel in take-up direction, the tape being secured at its trailing end to the supply reel to prevent disassociation of the tape therefrom, said mechanism being responsive to centrifugal force upon rotation of said take-up reel at relatively high speed in rewind direction consequent upon operation of the rewind drive means for releasing the lead end portion of the tape and conditioning itself for subsequent repetition of its tape securing function when said take-up reel is again rotated in take-up direction.

14. A self-loading reel for tape and the like comprising a hub on which tape is to be wound, a flange secured to one side of said hub for receiving on the hub side thereof the lead end portion of a tape, said flange including guide means extending outwardly from said hub to beyond the point of reception thereon of the lead end portion of the tape, tape securing means guided by said guide means for movement from the outer end portion of said guide means to said hub for moving the lead end portion of the tape to the hub and for clamping it to the hub, and over-center biasing means for so urging said tape securing means toward said hub, said tape securing means being movable by centrifugal action in the opposite direction, in response to a higher speed of rotation of said reel in re-wind direction, to thereby overcome the biasing action toward the hub and to release the lead end portion of the tape, and by over-center movement of said biasing means, conditioning the tape securing means for a subsequent tape loading operation.

15. A self-loading reel for tape and the like comprising a hub on which the tape is to be wound, a flange secured to one side of said hub for receiving on the hub side thereof the lead end portion of a tape, said flange including guide means extending outwardly from said hub to beyond the point of reception thereon of the lead end portion of a tape, tape securing means guided by said guide means for movement from the outer end portion of said guide means to said hub for moving the lead end portion of the tape to the hub and for clamping it to the hub, resilient means for urging said tape securing means toward said hub, and means responsive to reel rotation in take-up direction to cause said resilient means to urge said tape securing means toward said hub.

References Cited in the file of this patent

UNITED STATES PATENTS

| | | |
|---|---|---|
| 1,955,489 | Duncan et al. | Apr. 17, 1934 |
| 1,967,676 | Marchev | July 24, 1934 |
| 2,290,853 | Frankel | July 28, 1942 |
| 2,450,517 | Koppel | Oct. 5, 1948 |
| 2,640,659 | Biko et al. | June 2, 1953 |
| 2,813,686 | Schroter | Nov. 19, 1957 |

FOREIGN PATENTS

| | | |
|---|---|---|
| 157,967 | Switzerland | Jan. 2, 1933 |